US008615489B2

(12) United States Patent
Pershin et al.

(10) Patent No.: US 8,615,489 B2
(45) Date of Patent: Dec. 24, 2013

(54) STORING BLOCK-LEVEL TRACKING INFORMATION IN THE FILE SYSTEM ON THE SAME BLOCK DEVICE

(75) Inventors: Aleksey Pershin, Fremont, CA (US); Sudarsan R. Piduri, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 324 days.

(21) Appl. No.: 12/616,902

(22) Filed: Nov. 12, 2009

(65) Prior Publication Data
US 2010/0076934 A1 Mar. 25, 2010

Related U.S. Application Data

(63) Continuation-in-part of application No. 12/197,768, filed on Aug. 25, 2008, now Pat. No. 8,037,032.

(51) Int. Cl.
*G06F 17/00* (2006.01)
(52) U.S. Cl.
USPC .............. 707/625; 703/21; 707/694; 711/6; 718/102
(58) Field of Classification Search
USPC .................................................. 707/625
See application file for complete search history.

(56) References Cited

U.S. PATENT DOCUMENTS

| 7,100,089 B1 | 8/2006 | Phelps |
| 7,370,164 B1 * | 5/2008 | Nagarkar et al. ............. 711/162 |
| 7,743,031 B1 | 6/2010 | Cameron et al. |
| 7,886,119 B1 | 2/2011 | Cameron et al. |
| 8,037,032 B2 | 10/2011 | Pershin |
| 2005/0108296 A1 * | 5/2005 | Nakamura et al. ............ 707/200 |
| 2007/0094659 A1 | 4/2007 | Singh et al. |
| 2007/0271428 A1 | 11/2007 | Atluri |
| 2008/0162590 A1 | 7/2008 | Kundu et al. |
| 2009/0222496 A1 | 9/2009 | Liu et al. |
| 2010/0077165 A1 | 3/2010 | Lu et al. |

OTHER PUBLICATIONS

Ubuntu Forums "Does shutdown unmount drives" posted May 3-May 4, 2008 http://ubuntuforums.org/showthread.php?t=780596.*
Wikipedia regarding "Bit Array" as indexed in the file history as of May 23, 2008 http://en.wikipedia.org/w/index.php?title=Bit_array&oldid=214347829.*
PHD Consulting LLC. "EsXpress v3 Installation Guide", published Nov. 13, 2006.
PHD Technologies, Inc. "Introducing EsXpress v3", published Nov. 27, 2006.
PHD Technologies, Inc. "EsXpress v3.1 Users Manual", published Mar. 27, 2008.

* cited by examiner

*Primary Examiner* — Hosain Alam
*Assistant Examiner* — Bruce Witzenburg

(57) ABSTRACT

Writes to a storage device of a protected computer system are tracked in a manner that accounts for those writes that may occur during a system reboot process when the file system is not available. During the shutdown process, write tracking data is maintained in system memory and is written into storage locations allocated to the tracking file after the file system has been dismounted so that any writes that may occur during the file system dismount can be captured. During the boot process, temporary write tracking data is maintained in system memory even before the file system is mounted so that any writes that may occur immediately after the file system mount can be captured. The temporary write tracking data is later merged with the tracking data contained in the tracking file and the merged tracking data is used to track further writes to the storage device.

20 Claims, 11 Drawing Sheets

Bitmap 923C

| 0 | 1 | 0 | 0 | 0 | *** | 1 | 0 | 0 |
|---|---|---|---|---|-----|---|---|---|

Bitmap 723C (Restored)

| 0 | 0 | 1 | 0 | 1 | 1 | *** | 1 | 0 | 1 |
|---|---|---|---|---|---|-----|---|---|---|

Bitmap 1023C (Merged)

| 0 | 1 | 1 | 0 | 1 | 1 | *** | 1 | 0 | 1 |
|---|---|---|---|---|---|-----|---|---|---|

Fig. 10A

Bitmap 923E

| 0 | 0 | 0 | 0 | 1 | 1 | *** | 0 | 0 | 0 |
|---|---|---|---|---|---|-----|---|---|---|

Bitmap 723E (Restored)

| 1 | 1 | 0 | 0 | 0 | 0 | *** | 0 | 0 | 1 |
|---|---|---|---|---|---|-----|---|---|---|

Bitmap 1023E (Merged)

| 1 | 1 | 0 | 0 | 1 | 1 | *** | 0 | 0 | 1 |
|---|---|---|---|---|---|-----|---|---|---|

Fig. 10B

STORING BLOCK-LEVEL TRACKING INFORMATION IN THE FILE SYSTEM ON THE SAME BLOCK DEVICE

CROSS-REFERENCE TO RELATED APPLICATION(S)

This application is a continuation-in-part of U.S. patent application Ser. No. 12/197,768, filed on Aug. 25, 2008, which is hereby incorporated by reference in its entirety.

BACKGROUND

As data storage systems become ever bigger, providing efficient backup storage becomes increasingly important. Even if one is not concerned with the cost of the needed storage space, the time required to perform all the necessary copy operations becomes increasingly burdensome. For a large system, a full backup procedure can be time-consuming, requiring several hours or even days to complete. For this reason, backup procedures often provide "incremental" backups where only blocks or files which have changed since the last backup are copied. Typically, a full backup procedure is performed at infrequent intervals (for example, at an initial time followed by long intervals such as once per month). Thereafter, incremental backups are created more frequently, for example, once per day. Examples of commercial incremental backup products include TRUE IMAGE™ from ACRONIS®, Inc. and NORTON GHOS™ from Symantec Corporation.

Backups can be used for a variety of purposes. They can be used to recover from user error when, for example, the user inadvertently deletes or overwrites a file. They can be used to recover from data loss due to hardware failure such as a hard disk failure. They can also be used to recover from software failures such as application or operating system crashes. The goal of recovery after a crash is to restore the last available known good operating state for the complete system. This can be done by rebooting the same hardware after restoring the file system from a suitable backup, but the recovery procedure can be very time-consuming if the entire file system must be restored. For this reason, virtual machines (VMs) are sometimes used for backup purposes. When a VM is used for backup purposes, it is typically not used as a running machine unless and until it is needed for restoring a failed machine. Typically, the VM is launched, booted, and tested only to verify functionality and then it is shut down; however, it can be brought back on-line quickly if and when needed to replace the failed source machine for which it is functioning as a backup.

Using a VM as a backup is useful in that, if the source machine goes down, the VM can be quickly powered on in its place. With traditional backup methods, a full system restore can take hours, while the VM can be up and running in a few minutes. But whether using traditional file system backups or VMs as backups, changes made since the last backup procedure are lost. Examples of commercial products that enable VMs to be used for backup include POWERCONVERT™ from PLATESPIN®, Ltd. and VEEAM BACKUP™ from Veeam Software.

One way to perform incremental backups on a protected system is to track which blocks of a storage device of the protected system have been changed between backup cycles and transmit the changed blocks to the virtual machine performing the backup at the start of the next backup cycle. For system performance reasons, the tracking data is maintained in memory and a tracking file is allocated on the storage device to maintain a copy of the tracking data so that the tracking data can be preserved when the protected system is rebooted. During the rebooting process, however, the file system that manages the tracking file may not be available and as a result all writes may not be properly reflected in the tracking file.

SUMMARY

One or more embodiments of the present invention provide methods for tracking writes to a storage device where the storage device being tracked is the same storage device that has the file system in which the tracking information is stored. As used herein, a "storage device" may be a single or multiple storage volumes backed by a single or multiple physical storage arrays or configured in a storage area network or network attached storage.

With the methods according to the present invention, writes that may occur during a system reboot when the file system is not available can be accounted for. During the shutdown process, write tracking data is maintained in system memory and is written into storage locations allocated to a tracking file after the file system has been dismounted so that any writes that may have occur during the file system dismount can be captured. During the boot process, temporary write tracking data is maintained in system memory even before the file system is mounted so that any writes that may occur immediately after the file system mount can be captured. The temporary write tracking data is later merged with the tracking data contained in the tracking file and the merged tracking data is used to track further writes to the storage device.

One or more embodiments of the present invention further provide a computer backup system, e.g., a physical-to-virtual backup system. This system includes a first computer system having a system memory and a storage device, and a second computer system having a system memory and a virtual machine that is configured to be a backup of the first computer system. The first computer system is configured with a file system and a bitmap driver for tracking writes to the storage device by updating tracking data stored in the system memory. The tracking data indicates blocks of the storage device that have been changed since a last backup cycle and the changed blocks are transmitted to the second computer system for use in performing an incremental backup. The bitmap driver is configured to track writes to the storage device through a shutdown process and a reboot process of the first computer system by: (i) committing the tracking data to storage locations of the tracking file stored in the storage device after the file system is dismounted in connection with the shutdown process, and (ii) after the reboot process is initiated, tracking writes to the storage device prior to the file system being mounted, after which the tracking file is loaded into the system memory.

BRIEF DESCRIPTION OF THE DRAWINGS

FIGS. 10A and 10B illustrate the process of merging bitmaps in accordance with one embodiment of the invention.

DETAILED DESCRIPTION

Figure 1:
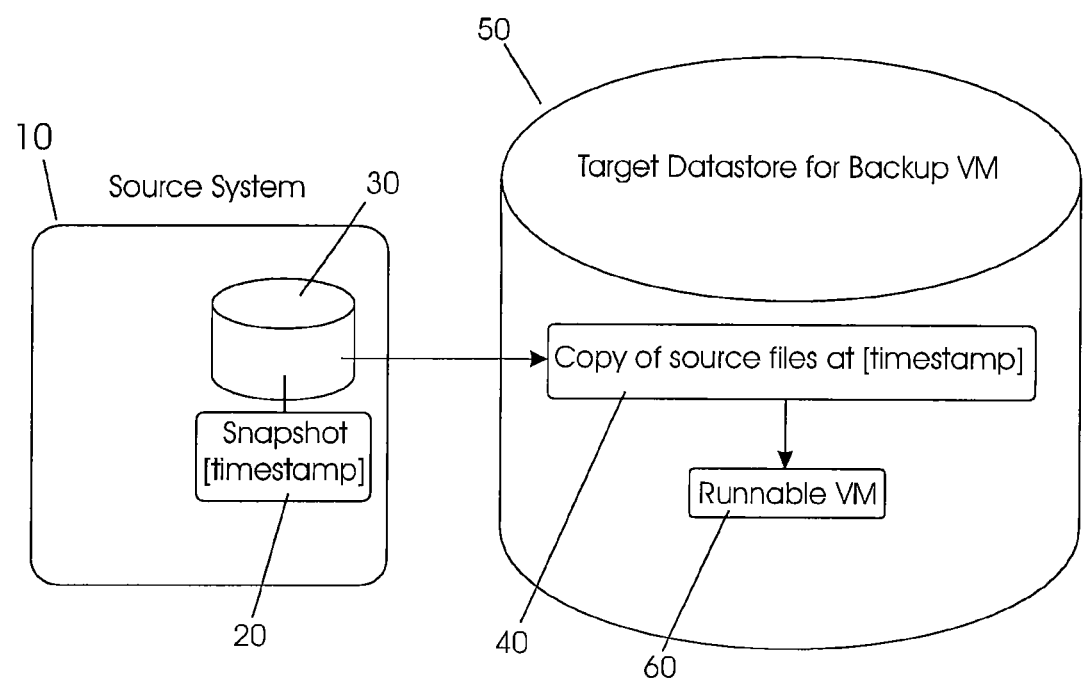
FIG. 1 helps illustrate steps involved in converting a running source machine to a virtual machine (VM).

As is well known, a virtual machine (VM) is a software abstraction, or "virtualization," of an actual physical computer system. A VM typically has a "guest" operating system (OS) of its own such as, for example, a WINDOWS® OS, a LINUX OS, or an OS-X OS.

One or more embodiments of the present invention are methods for managing backups of source computing machines (either physical machines or VMs) using VMs (note that a source computing machine is sometimes referred to herein as a source machine or as a source system). In accordance with one or more such embodiments, a backup can be for an entire source machine, including an operating system and all volumes of all disks associated with the source machine, or it can be for selected volumes of selected disks according to the needs and desires of a user. For example, a source machine with a large file system comprising multiple disks and volumes may serve both critical and non-critical roles. The user can choose to use VM backup methods to back up only those volumes necessary for critical roles, namely volumes containing the operating system and certain application-specific files. Non-critical files and volumes can be backed up separately, for example, on a less frequent schedule using a backup method that does not create VMs. Such separation into critical and non-critical backups can reduce the overhead and time required to create and maintain a backup for critical files, thereby enabling more frequent backup of the critical files.

Typically, in accordance with one or more embodiments of the present invention, a full backup procedure is carried out at infrequent intervals (an initial time followed by intervals such as, for example and without limitation, once per month). Thereafter, incremental backups can be created more frequently, for example, once per day, or even once every few minutes, provided resources and time required to carry out an incremental backup procedure is small enough.

In accordance with one or more embodiments of the present invention, the full backup procedure is carried out by converting the source computing machine to a VM, for example and without limitation, using methods that can be used to create a clone VM from a source machine. For example, one such method is performed by VMWARE CONVERTER™ with or without P2VMOTION™ from VMware, Inc. This conversion is commonly referred to as "P2V conversion" (physical-to-virtual conversion), although the source machine can also be a VM. This full backup procedure can take several hours, if not days. As such, usually, it will be scheduled to occur at regular intervals. Full backups typically require relatively large amounts of storage space, and users (for example, system administrators) may not wish to maintain copies of successive full backups indefinitely. For example, each new VM thusly created can be stored during creation as a temporary VM, and then renamed to replace a runnable backup VM once the full backup procedure is complete. Alternatively, a series of two or more timestamped VMs can be maintained to allow roll-back to a machine state at a choice of times.

Using incremental backups can reduce storage requirements and reduce, and even minimize, time between carrying out backup procedures, thereby reducing the potential amount of lost data. As with traditional incremental backup procedures, a backup procedure using a VM as an incremental backup only transfers changed blocks or files, thereby reducing overall backup time. This reduces the amount of data that must be transferred over a network to a target datastore and the load on the source computing machine to read and send the data, as well as the load on the destination machine to receive and store the data. Use of an incremental backup procedure can also enable a user to schedule more frequent running of the backup procedure: for example, once per hour or even more frequently, thereby reducing the amount of data that would be lost when it is necessary to use the backup VM due, for example, to a crash of the source computing machine. An additional benefit of using VMs for backup is that a user can test the backup VM between scheduled backup procedures, if desired, without disrupting the source computing machine.

In accordance with one or more embodiments of the present invention, a source system is a running physical machine, and a full backup procedure is carried out by converting the source system (including all or selected storage volumes thereof) to a VM (for example, without interrupting the activities of the source system). This converting step can use a converter agent (e.g., VMware Converter) which runs on the source system. FIG. 1 shows schematically the conversion of running source system 10 to a VM. As shown in FIG. 1, the conversion comprises steps of: (a) creating source snapshot 20 of source system storage volume 30 (which may be all or a subset of volumes accessed by source system 10); (b) creating a storage location 40 on target datastore 50 for a copy of source system storage volume 30 as it existed at the time defined by source snapshot 20, wherein the target datastore 50 can be accessed by a computing machine (not shown for ease of illustration) that will host the backup VM; (c) copying data specified by source snapshot 20 to source copy 40 on target datastore 50; (d) reconfiguring and customizing source copy 40 to create runnable VM 60; and (f) storing runnable VM 60 on target datastore 50.

For example and without limitation, source snapshot 20 may be created using VSS snapshot (a utility built into WINDOWS® versions since Windows XP) or third party software such as that available from ACRONIS® Inc. or STORAGECRAFT™ Technology Corporation. Source snapshot 20 captures the state of source system 10 volumes at a point in time. As is well known, a "volume" is a portion of a storage medium such as a disk (physical or virtual) that is treated as a unit by an operating system. For example, in WINDOWS operating systems, volumes are designated by "drive" letters. A volume can be all or part of a physical disk, and it can also include portions of multiple disks as, for example, when using Redundant Array of Independent Disks (RAID) storage schemes. A volume is typically "formatted" with a "file system" to enable an operating system to read and write individual files. In addition, a "snapshot" of a volume represents an image of the complete state of a volume at a point in time. A snapshot is usually not a physical copy, since it is undesirable to stop a running machine while a physical copy is made. Instead, a snapshot operation itself usually comprises recording a timestamp, and, thereafter, preserving pre-snapshot versions of all files, including subsequently deleted files. In normal operation, the operating system and application software see only the new version of the file system, including all changed and deleted files, and preserved presnapshot versions of files are made available via a special interface. When used in carrying out a backup procedure, a "source snapshot" is typically transient, and it is deleted after completion of the backup procedure. After a source snapshot is created, the source machine continues to write to volume(s) as usual, but any previously-used blocks which would be overwritten are copied into a snapshot file so that they are not lost and can be retrieved via the special interface.

In accordance with one or more further embodiments, the source machine is a VM which is running. The same snapshot methods used for a physical machine can also be used. Alternatively, the host machine for the source VM can create the snapshot file outside of the source VM using additional data storage outside that is allocated for the running source VM.

In accordance with one or more embodiments of the present invention, an incremental backup procedure can be performed either at a block level or at a file level. A "block" is a portion of a volume. For backup purposes, it can be convenient to divide a volume into equal-sized blocks (sometimes with an irregular-sized block at the beginning to maintain alignment). The size of the blocks is set at the time the full backup procedure is carried out. While the block size may be arbitrary, it can be convenient to match the block size to a cluster size of the file system on the volume, where a "cluster" is a minimum-sized portion of a file system that can be read or written in a single operation. The cluster size is determined by a file system structure defined by an operating system, for example, when a disk volume is formatted. A typical cluster size is 4 kB, and is typically a multiple of a sector size, where a "sector" is a minimum-sized portion of a volume that can be read or written at a hardware level. For volumes on magnetic disks, a sector size is typically 512 bytes. For volumes on optical disks, a sector size is typically 2 kB. For unrecognized volumes, where the cluster size is not readily apparent, a default block size can be used.

When operating at the block level, the incremental backup procedure determines which blocks have changed since the last backup procedure, and it transfers only the changed blocks. When operating at the file level, the incremental backup procedure determines which files (or portions of files) have changed since the last backup procedure, and transfers only the changed files. In accordance with one or more such embodiments of the present invention, the operating mode (for example, file level or block level) for the incremental backup procedure must be chosen at the time of the first full backup procedure, and it cannot be changed until another full backup is made.

Performing incremental backups at the file level has an advantage of being independent of an underlying file system structure. As such, the source volume can be defragmented, or even restored, from another backup, without affecting the incremental backups. In particular, the incremental backup procedure sees only the contents of each file, and it disregards where the file is actually stored in a volume. However, file-level backup is generally more complex than block-level backup, because there are many file operations besides "read" and "write" (for example, "rename" and "delete") that need to be captured and properly "replayed" on the backup volume. In particular, implementing block level incremental backup is easier than file level incremental backup because, for each block in a volume, the backup procedure only needs to know whether or not the block has changed. There is no need to be aware of any high-level file operations. However, simple defragmentation will cause a large amount of data in the volume to be transferred during the next incremental backup because many blocks will have changed even if files have not. For most users, defragmentation is performed at infrequent intervals and block mode backups are preferable.

In certain embodiments, the volume is not split into equal-sized blocks starting from the very beginning of the volume. For example, when using certain file systems (such as FAT12, FAT16, and FAT32), there is an area at the beginning of the volume that is reserved for file system use, and it is possible for backup blocks to be misaligned with respect to file system clusters, thereby causing a potential doubling of the amount of data that must be transferred during incremental backup procedures. To make sure that backup blocks are aligned with file system clusters, the first backup block on the volume can be of any size (but no larger than the size of the remaining blocks).

In certain other embodiments, for example using NTFS file systems, no alignment is necessary, and the first backup block can have the same size as all other backup blocks. File systems, not requiring alignment (like NTFS) will be used as exemplary to simplify presentation of other aspects of embodiments of the present invention.

In addition to maintaining alignment with respect to any irregularly sized storage area at the beginning of the volume, it can be useful to maintain alignment of groups of clusters. For example, in accordance with one or more embodiments of the present invention, the backup procedure can use stored information about which blocks are currently in use. In accordance with one or more such embodiments, a set of bits is stored where each bit represents whether or not a particular block is in use, and the backup procedure can process only blocks whose corresponding bit indicates that it is in use. For example and without limitation, these bits can be grouped into bytes (8 bits), and it can be computationally convenient to keep backup blocks aligned on 8-cluster boundaries so that in-use indicator bytes remain aligned.

An incremental backup procedure must first determine which blocks or files have changed since the last backup (whether full or incremental). In accordance with one or more embodiments of the present invention, to determine whether a particular block needs to be copied during the next incremental backup, hashes are calculated for each block. A hash is a relatively small integer that is calculated by a pre-defined formula from a set of data, where "relatively small" is measured by comparison to the size of the dataset since the hash ought to take less storage, and preferably significantly less storage, than the dataset for it to be useful. Hashes are designed so that any change in the set of data is likely to result in a different hash. There are many specific algorithms that can be used depending on the nature of the data, possible errors or differences, and the application. Thus, any hash algorithm that gives a suitably high probability of generating a unique value for each block may be used as long as any changes made to a block are likely to cause a different number to be generated. Tradeoffs can be made between higher probability of uniqueness on the one hand and algorithm complexity and hash length on the other hand. For example, the SHA-256 algorithm produces a 256-bit (32-byte) number that provides robust detection of differences between blocks while not requiring excessive storage or calculation time. For typical file systems, the cluster size is 4 kB (4096 bytes), and the total storage space required for the hash values is 32/4096=0.8% of the file system size.

In accordance with one or more such embodiments, blocks that have the same hash values are assumed to be the same and are not transferred. If a block is changed, but has exactly the same hash value as the corresponding block on the target volume, the block will not be transferred and the data will be lost. Using a good hash algorithm makes the probability of such data loss low, and using a hash function at least as robust as the SHA-256 algorithm makes the probability of data loss acceptably low for almost all users. Less robust algorithms may also be acceptable to many users.

In accordance with one or more embodiments of the present invention, hashes are stored in a hash file (not shown) on target datastore 50 (referring to FIG. 1). Further, in accordance with one or more such embodiments of the present invention, program code for an incremental backup procedure is installed on the source system (referring to FIG. 1, source system 10) where it can have the fastest access to all volumes of the source system storage (referring to FIG. 1, source system storage volume 30). As such, and in accordance with one or more such embodiments, hash calculations and comparisons are performed on the source machine (referring to FIG. 1, source system 10). Therefore, the source machine must retrieve the hash file from the target datastore (referring to FIG. 1, target datastore 50). For simplicity, one can describe the process as if the entire hash file is read from the target datastore at the beginning of an incremental backup procedure. In accordance with one or more such embodiments, program code for the incremental backup procedure can use a fixed-size buffer for the hash file to minimize memory requirements. In addition, as a further optimization, the code does not need to calculate the hash values for all source blocks in advance. Instead, the code can read source blocks in relatively small chunks, calculate hash values for all blocks in the chunk, and then, transfer changed blocks and hashes to the target datastore. In this way, data transfer to the target datastore can proceed in parallel with subsequent source block reads and hash calculations, thereby saving time overall.

Note, however, in accordance with one or more embodiments of the present invention, that the entire source volume (referring to FIG. 1, source system storage volume 30) must be read and new hashes for every used block must be calculated, regardless of how many blocks need to be transferred. Typically, the incremental backup procedure runs on the source system with local (or fast) access to the source volumes. While source volume access may be fast, the time required for reading all used blocks and calculating new hashes can be a limiting factor in determining how frequently incremental backups can be performed. An incremental backup can still take much less time than a full backup, because the time required for copying blocks and their associated hashes to the target datastore is typically much longer than that needed to read blocks and calculate hashes on the source system. Reducing the number of blocks that must be copied is therefore an important factor in minimizing the time required for a new backup.

In accordance with one or more embodiments of the present invention, the block hash file can be stored on the target datastore in a separate virtual disk called a hash disk. The hash disk can have a real master boot record (MBR) with exactly one partition covering the entire disk. Although, the hash disk need not be made visible to the guest operating system of any bootable VM, maintaining a valid MBR structure is useful to protect the hash data from accidental access.

Figure 2:
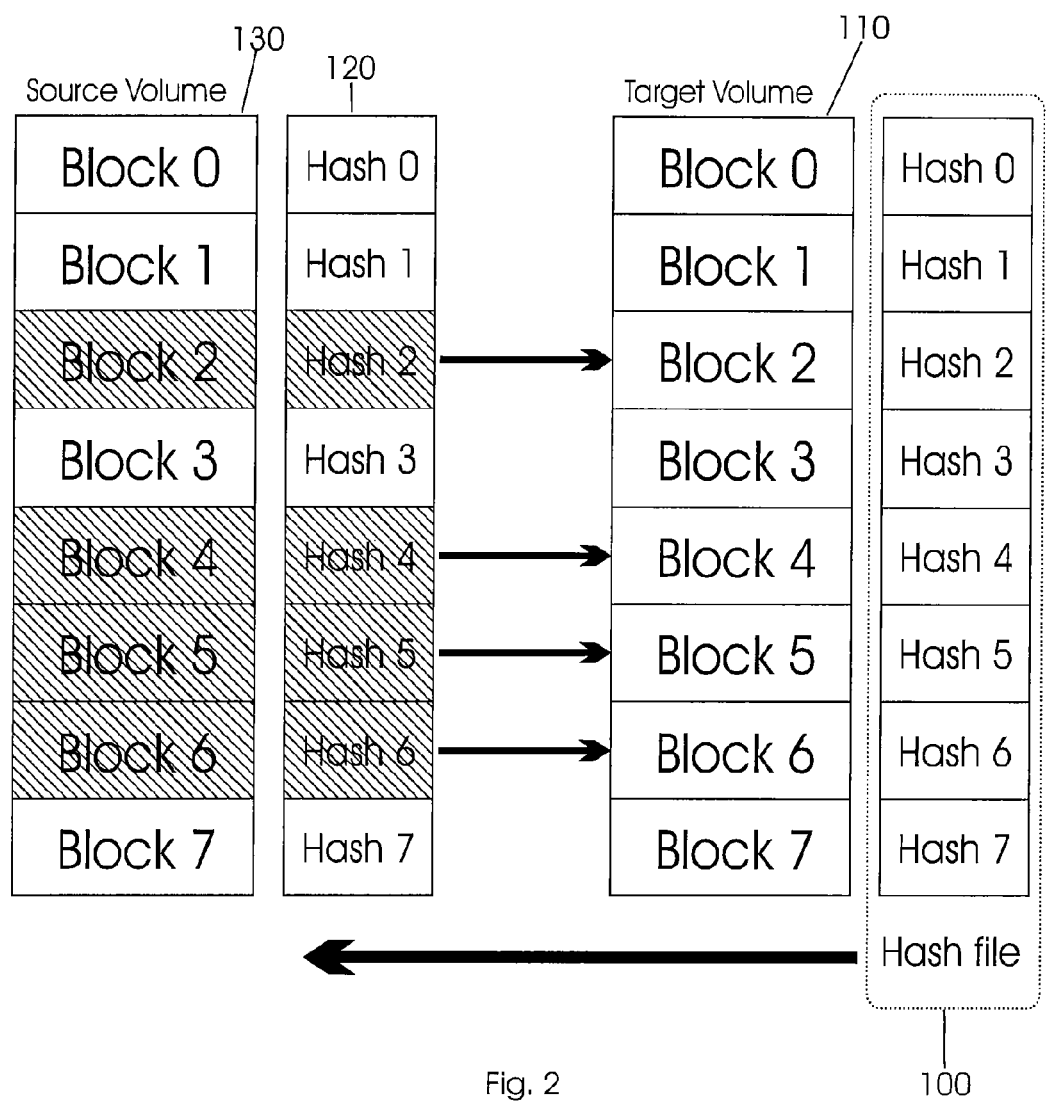
FIG. 2 provides a block diagram that helps illustrate an incremental backup procedure that operates in accordance with one or more embodiments of the present invention.

FIG. 2 provides a block diagram that helps to illustrate an incremental backup procedure that operates in accordance with one or more embodiments of the present invention. As indicated in FIG. 2, in accordance with the incremental backup procedure, hash file 100 for the latest prior backup on target volume 110 is retrieved from the target datastore and sent to the source machine. Then, in accordance with one or more such embodiments of the incremental backup procedure, matching hashes 120 are calculated for a snapshot of matching source volume 130. In the embodiment illustrated in FIG. 2, hashes for shaded blocks 2, 4, 5, and 6 are found to be different, and shaded blocks 2, 4, 5, and 6 are sent back to the target datastore along with their new hash values to complete an incremental update in accordance with the incremental backup procedure.

In accordance with one or more such embodiments, as successive incremental backup procedures are performed, it is not necessary to generate complete new copies of the backup VM. Rather, the backup VM can be managed using "VM snapshots" together with a set of "redo log files." A VM snapshot is taken (i.e., a timestamp is recorded) to establish the state of the backup VM at a point in time. Note that a "source snapshot" and a "VM snapshot" are used differently. Both start by setting a timestamp. As used in a backup procedure, a source snapshot (of a source machine volume) is temporary, and it is deleted after an incremental backup is completed. On the other hand, a VM snapshot is persistent and is not deleted unless and until it is no longer desired to retain a particular backup state (for example, after several months). Also, a VM snapshot manages the storage of pre- and post-snapshot data differently from the way a source snapshot manages the storage of pre- and post-snapshot data. In particular, after a VM snapshot is created, instead of copying pre-snapshot files to a "snapshot file" when changes or deletions occur, the pre-snapshot files are left untouched and the changes are written to one or more "redo log files." A redo log file is a collection of data in one or more files of a file system where file system writes are made after a VM snapshot. If a subsequent VM snapshot is created, a new redo log file is started at the time of that subsequent snapshot. It is then possible to "revert" a VM to any earlier state (i.e., a state marked by an earlier timestamp) by choosing which redo log file(s) to use. More generally, one can "switch" between any two snapshots by enabling and/or disabling the use of appropriate redo log file(s). The "active state" of a VM is the state represented by the snapshot reached after any reverting and switching which may have been conducted.

When a guest operating system of a VM requests a block of data, the virtualization software first checks the current redo log file. If the block of data is in the redo log file, the data are read and returned to the guest operating system. If not, the virtualization software next checks the immediate parent redo log file. This process of checking successive parent redo log files continues until the block of data is found. There is guaranteed to be a block of data available in a base VM snapshot if none is found in any of the subsequent redo log files (i.e., if no change has ever been made to that block). If and when it is necessary to revert to an earlier version, the virtualization software searches for blocks starting in the appropriate prior redo log file instead of the latest one, thereby ignoring changes which occurred after the timestamp of the earlier version.

In general, it is possible to create more than one redo log file associated with a particular VM snapshot. For example, after a first VM snapshot, one can create a first redo log file and even create subsequent snapshots and redo log files to track changes to a VM after the first VM snapshot. A user may then choose to revert to the first VM snapshot and start a second redo log file to track a different set of changes starting over from the first VM snapshot. To keep track of such multiple paths it is convenient to describe VM snapshots as arranged in a "snapshot tree," where the process of reverting a VM and starting an additional redo log file from a particular VM snapshot creates an additional branch of the tree.

In accordance with one or more embodiments of the present invention, changes associated with reconfiguring and customizing the latest copy of a source system volume to create a bootable VM must be undone before a subsequent incremental backup can be performed. In other words, the incremental backup should start from the most recent incremental or full copy of the source system volume, and the reconfiguration and customization steps should then be repeated on the updated copy of the source system volume. Any changes made to the incremental or full copy during a previous reconfiguration and customization would show up as differences that needed to be "corrected" on the next incremental backup, so they would be lost and have to be recreated anyway. Undoing those changes first can reduce the amount of data transferred during the incremental backup procedure. In accordance with one or more embodiments of the present invention, hashes used to identify changed files or blocks are not available in snapshots of bootable VMs, and one must revert to a state that includes the hash disk to make it available for retrieval by the incremental backup process.

The changes associated with reconfiguration and customization and hash disk removal can be stored in a redo log file. It is convenient, therefore, to describe both the copies of source system volumes and the backup VMs as part of a single snapshot tree. For convenience in describing portions of this snapshot tree, the term "VM snapshot" is used herein both to designate snapshots of bootable VMs and to designate snapshots of the copies of source machine volumes that may require reconfiguration and customization to create bootable VMs. Such copies or backups of source machines may not be VMs but rather intermediates in the process of creating VMs. Their snapshots are included in the snapshot tree so that they can be treated equally with the snapshots of bootable VMs as members of a family or tree of data connected by a series of change events, wherein some of those change events comprise the steps of reconfiguring and customizing necessary to create bootable VMs. Note that the changes in the hash file are also recorded in the snapshot tree and written into redo log files. As previously described in accordance with one or more embodiments of the present invention, this can be achieved by storing the hash file in a separate virtual disk. This virtual disk is associated with the backup VM whose changes are captured by the snapshots and redo log files outlined by the snapshot tree. This virtual disk, being present only in the intermediate states representing the copies of source volume data (i.e., those whose names begin with "Backup" as described below), is never actually accessible to the guest operating system of a bootable VM.

While embodiments of the present invention are described herein, wherein the hash data are stored in a hash file on a virtual disk associated with the backup VM, other configurations can also be used to store the hash data. For example, the hash data can be stored in storage separate from that used to store the backup VM, and the changes in the hash data from one incremental update to the next can be recorded by any suitable means and in any suitable location, either the same, or different from that used to record changes in the backup VM, as long as the incremental update procedure can access a set of hash data that can be properly matched to a set of blocks or files for a particular incremental update.

Figure 3:
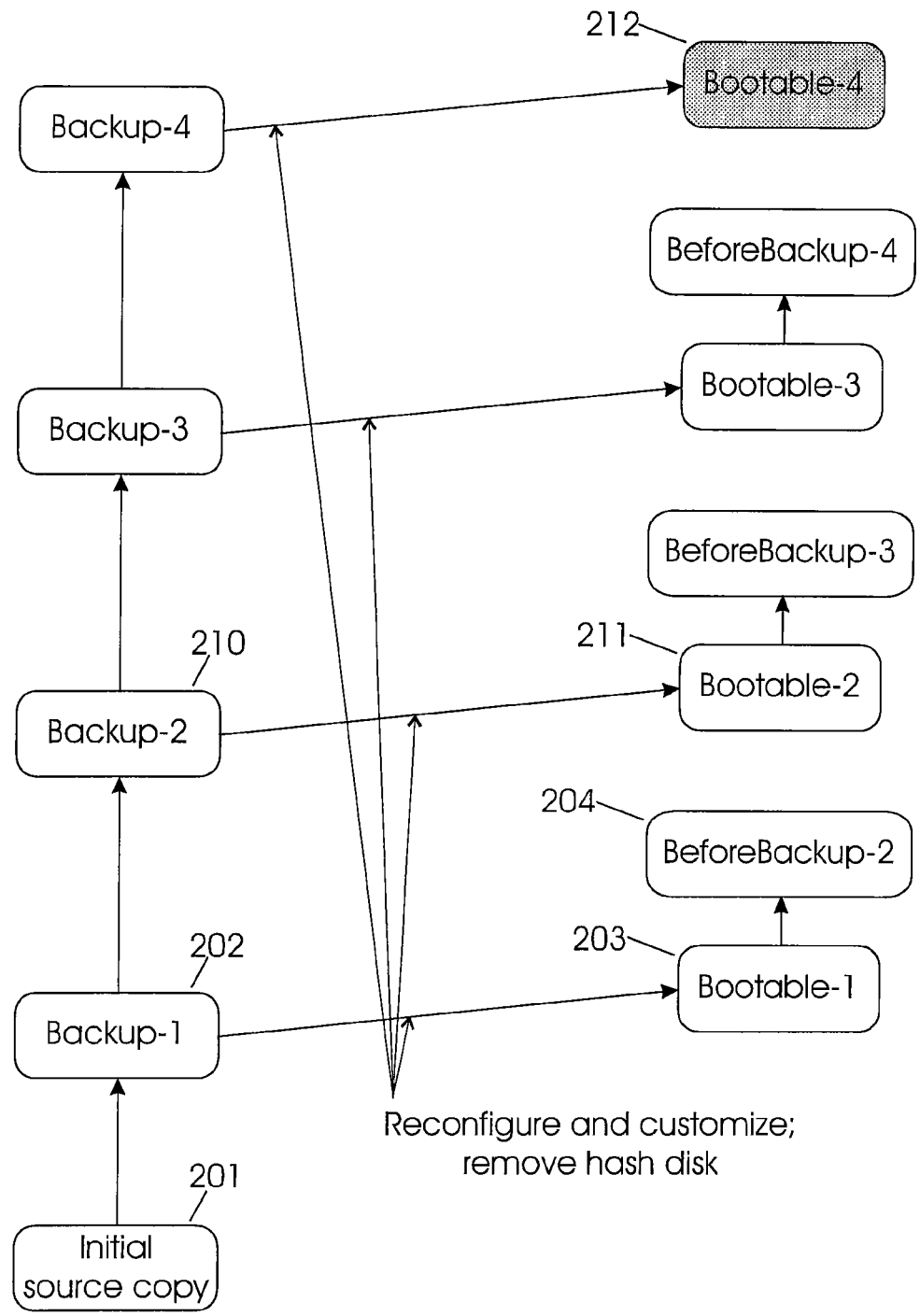
FIG. 3 provides a "snapshot tree" that shows all VM snapshots created after three incremental backup procedures have been performed in accordance with one or more embodiments of the present invention.

FIG. 3 shows a snapshot tree with all VM snapshots created after three incremental backup procedures have been performed in accordance with one or more embodiments of the present invention. The left-hand column (i.e., the "trunk") of the snapshot tree of FIG. 3 shows successive incremental backups of the source volume(s) where no reconfiguration or customization has been carried out thereon. In accordance with one or more embodiments of the present invention, these successive incremental backups of the source volumes are stored as successive VM snapshots of data which includes copies of source volumes and associated hash disks (if used). These VM snapshots are typically assigned names herein beginning with "Backup" as shown in FIG. 3. (Note the distinction between a "Backup VM 5 snapshot" [uppercase 'B'] which is a VM snapshot of one of these copies of source system volumes and a "backup VM" [lowercase 'b'] which is a bootable VM, whose evolution can be represented with the aid of a snapshot tree.) As set forth above, successive Backup VM snapshots (timestamps) and redo log files capture changes from one backup to the next.

The right-hand column of the snapshot tree of FIG. 3 shows VM snapshots of bootable VMs. The "Bootable VM snapshots" are VM snapshots of the bootable VMs created when the hash disk has been removed and any required reconfiguration and customization has been carried out on one of the Backup VM snapshots. The "BeforeBackup VM snapshots" further capture any user-implemented changes applied to application programs which are installed on the bootable VM. In accordance with one or more embodiments of the present invention, a redo log file records file system changes required to convert a Backup VM snapshot on the left-hand column to a corresponding Bootable VM snapshot in the right-hand column. Further, as is described in more detail below, after each incremental backup procedure, the most recent (i.e., the top-most) Bootable or BeforeBackup VM snapshot (i.e., Bootable-4 212 in the right-hand column of FIG. 3) is the most up-to-date bootable VM snapshot, and it can be powered up if and when it is needed.

Initial source copy 201 in the left-hand column of FIG. 3 is a copy of the source system volume(s) specified for backup and a hash disk. If the source system is a VM, then initial source copy 201 may be a bootable VM; however, if the source system is a physical machine, it will not be. Nevertheless, even if the source system is a VM, some reconfiguration and customization may be required to enable it to run in a particular environment.

In accordance with one or more embodiments of the present invention, a first VM snapshot (Backup-1 202) is created after initial source copy 201 is complete. (For simplicity, time stamps mentioned below are replaced with sequence numbers.) This first VM snapshot is used as a base for subsequent VM snapshots, i.e., it is the base or root of the snapshot tree. Note that, in accordance with one or more such embodiments, forming a snapshot comprises setting a timestamp and allocating a redo log file-no entries in the redo log file are made at this point in time. In accordance with one or more such embodiments, the name of the snapshot can include an appended timestamp to make it unique, although other algorithms for creating unique names can also be used.

For example, and without limitation, any VM snapshot on the left-hand side of FIG. 3 can be named "Backup-[timestamp]." Each Backup VM snapshot is used as a starting point for the next incremental backup via a set of redo log files. Each backup VM snapshot is associated with an additional redo log file (on a different branch of the snapshot tree) for creating a corresponding bootable VM. The Backup VM snapshots are typically not bootable and should never be booted and run.

In accordance with one or more embodiments of the present invention, to create a bootable backup VM, the hash disk is removed from Backup-1 (VM snapshot) 202 and any necessary reconfiguration and customization transformations are applied thereto. As set forth above, these reconfiguration and customization transformations cause change blocks to be created, and in accordance with one or more embodiments of the present invention, these change blocks are stored in the redo log file created at the time of Backup-1 VM snapshot 202. In accordance with one or more such embodiments, at the time every VM snapshot is created, a new redo log file is associated with it to record changes that occur after the time of the snapshot. As a final step in preparing a bootable VM, once the necessary reconfiguration and customization transformations are complete, a Bootable VM snapshot (for example, Bootable (VM snapshot) 203 of FIG. 3) is created with a unique name. For example, this Bootable VM snapshot can be named "Bootable-[timestamp]," where the timestamp would be the same as that of the corresponding Backup VM snapshot since they reference the same backup event. Thus, for every incremental backup VM created, at least two snapshots are created, one before and one after the reconfiguration and customization (and hash disk removal) procedure.

In accordance with one or more embodiments of the present invention, when it is time to perform the next incremental backup procedure: (a) the snapshot tree is "reverted" (i.e., the VM represented by the snapshot tree is reverted) to the most recent Backup VM snapshot (for example, Backup-1 202 of FIG. 3); (b) a new redo log file is created for that Backup VM snapshot; (c) a new source snapshot is created to freeze the state of the source system volume(s) for the incremental backup (the source system may continue to modify the source system volume(s), and post-snapshot modifications will be captured in the following incremental backup); (d) the hash file from the most recent Backup VM snapshot is transferred to the source system; (e) hashes from the hash file are compared to newly computed hashes for the source system, and change blocks and hashes are transferred and written into the new redo log file; (f) when all change blocks and hashes are transferred, a new Backup VM snapshot and redo log file (for example, Backup-2 210 of FIG. 3) are created; (g) the hash disk is removed, reconfiguration and customization transformations are applied thereto to the new Backup VM to create a new bootable VM and (h) a VM snapshot (for example, Bootable-2 211 of FIG. 3) is created of the new bootable VM.

A user or system administrator can boot from a Bootable VM snapshot to test it to make sure that it works properly. For example, the user may need to test applications to identify scripts needed to prepare the VM for a takeover in the event the source system goes down. Such scripts may be needed to adapt particular applications to the environment in which the VM will run in the event that they were not automatically adapted by the reconfiguration and customization transformation steps that were a part of creating the bootable VM. Once the reconfiguration, customization, and adaptation steps are complete, it is generally possible to power on the resulting VM quickly, and the overall system downtime from a failure of the source system to the availability of a replacement VM can be just a few minutes.

Once testing is complete, the bootable VM is typically shut down until it is needed for recovery purposes. Further, any scripts that were created to adapt applications can be recorded for reuse in conjunction with future Bootable VM snapshots. In some cases, it is also possible to implement the functionality of the scripts directly in the source machine so that they are no longer needed.

To prevent loss of user changes to a Bootable VM snapshot, in accordance with one or more embodiments of the present invention, the incremental backup procedure creates yet another Bootable VM snapshot, referred to herein as BeforeBackup VM snapshot (for example, BeforeBackup-2 204 of FIG. 3), on top of a Bootable VM snapshot (for example, Bootable-1 203 of FIG. 3) before reverting to the latest Backup snapshot. The BeforeBackup VM snapshot can be given another unique name such as "BeforeBackup-[timestamp]." The timestamp for this snapshot can be the same as the timestamp for the Backup VM snapshot that is about to be created. However, in accordance with one or more such embodiments, in certain cases, it may not be necessary to create the BeforeBackup VM snapshot. For example, if the Bootable VM snapshot has never been booted, or if it has, but it was only tested but not reconfigured in any way, then no changes need to be captured. Since a VM snapshot will have an associated redo log file that records all changes that take place after the snapshot time, if the redo log file for the current Bootable VM snapshot is empty, there is no need to create the corresponding BeforeBackup VM snapshot. However, it is not always straightforward to determine whether the redo log file for a snapshot is empty or not. To work around this, in accordance with one or more embodiments of the present invention, the incremental backup procedure can analyze the current Bootable VM snapshot before starting an incremental backup procedure. If it can determine that the current Bootable VM snapshot is not the same as one of the Bootable VM snapshots, then a BeforeBackup VM snapshot is needed. Some systems provide a "changeID" for a disk, indicating which files have changed after a particular timestamp, or alternatively, a list of change blocks after a particular timestamp. If one of these resources is available, the incremental backup procedure can skip creating the BeforeBackup VM snapshot if the current Bootable VM snapshot has never been modified (i.e., if its redo log file has not been changed since it was created).

Figure 4:
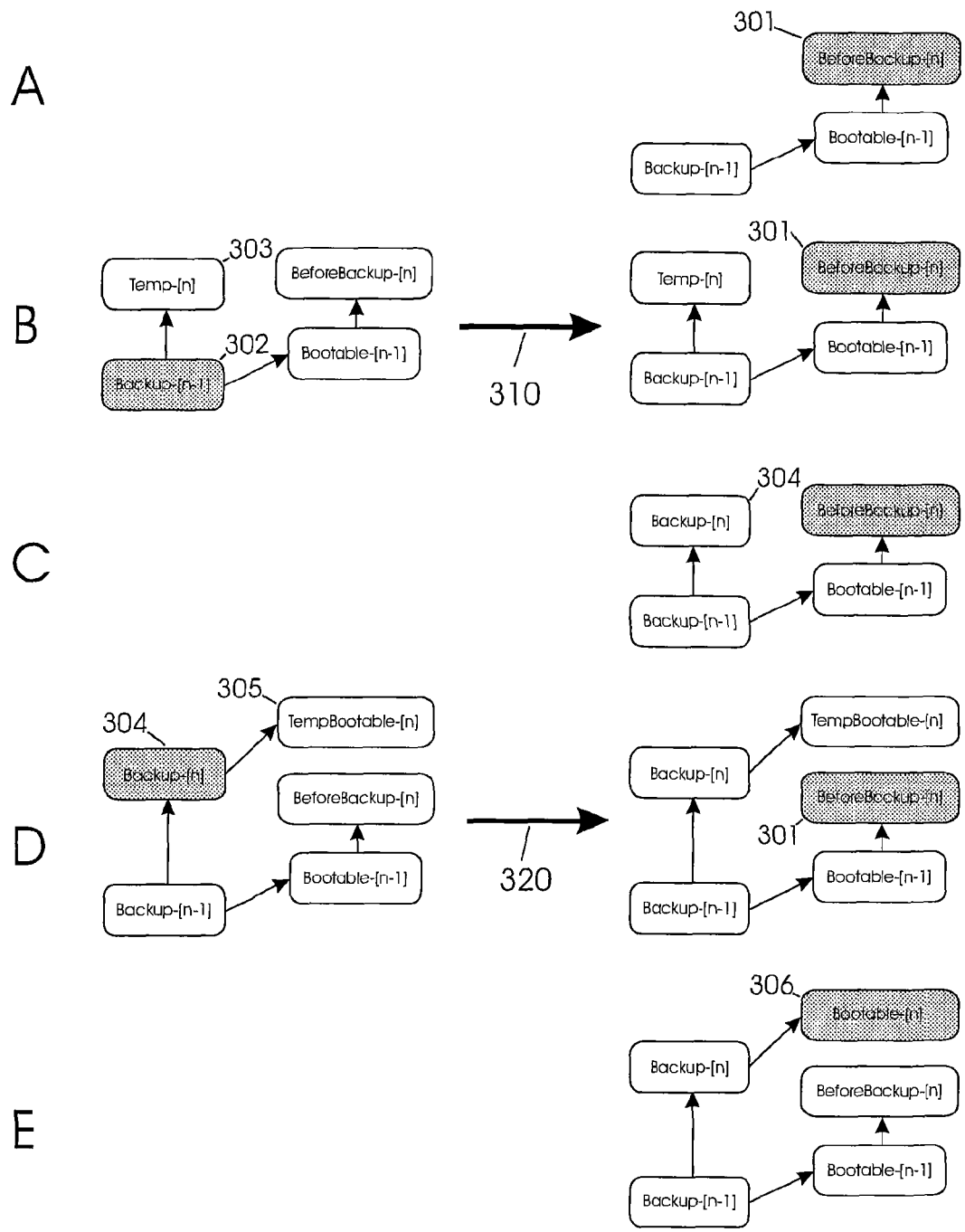
FIG. 4 is a sequence of frames that show changes to a portion of a VM snapshot tree during one incremental backup procedure step that operates in accordance with one or more embodiments of the present invention.

As described so far, during the time that an incremental backup procedure is being carried out, for example, by transferring the hash file and copying updated files or blocks, the "active state" of the snapshot tree (i.e., the active state of the VM represented by the snapshot tree) is that of the most recent Backup VM snapshot. As such, that state does not represent a bootable VM. It can take significant time to transfer all change blocks for the incremental backup. As such, it can be desirable to have a bootable VM ready to use in the event of source system failure during the incremental backup procedure. To provide such a bootable VM, in accordance with one or more embodiments, the active state of the snapshot tree is reverted and switched so as to keep it in the latest bootable state as much as possible. Essentially, the state of the snapshot tree is reverted to the most recent Backup VM snapshot only to create a new temporary VM snapshot, and then immediately switched back to the current Bootable or BeforeBackup VM snapshot. Once the next set of modifications is written into the redo log file for the temporary snapshot, that temporary snapshot can be renamed, and the next step (if any) can proceed. This sequence is illustrated in FIG. 4, where steps to create a "Bootable-[n]" VM snapshot are illustrated. In particular, FIG. 4 shows a sequence of steps and sub-steps as explained below that illustrate a portion of a backup VM snapshot tree during one incremental backup procedure that operates in accordance with one or more embodiments of the present invention. Each of the five lettered steps of FIG. 4 comprises either one or two sub-steps, each of which illustrates a segment of the snapshot tree of FIG. 3. At each step or sub-step, the active state of the snapshot tree is marked by shading. Steps B and D illustrate the brief reverting and immediate switching back to the most recent bootable state.

As shown in FIG. 4, first, at Step A, "Before-Backup-[n]" (VM snapshot) 301 is created from Bootable [n−1]. Next, at Step B, the active state of the snapshot tree is reverted to "Backup-[n−1]" 302 and new VM snapshot 303 (which is called "Temp-[n]") is created. Then, as indicated by arrow 310, the active state of the snapshot tree is switched immediately back to Before-Backup-[n] 301. Next, at Step C, the incremental backup procedure copies change blocks and hashes to the redo log file for Temp-[n], which is then renamed "Backup-[n]" 304. Next, at Step D, the active state of the snapshot tree is reverted to Backup-[n] 304, and another new Bootable VM snapshot 305 (which is called "TempBootable-[n]") is created. Then, as indicated by arrow 320, the active state of the snapshot tree is again switched immediately back to Before-Backup-[n] 301. Next, at Step E, reconfiguration and customization steps necessary to create "Bootable-[n]," plus the removal of the hash disk, are implemented by writing to the redo log file for TempBootable-[n], which is then renamed to "Bootable-[n]" 306. Finally, also at Step E, the active state of the snapshot tree is switched to Bootable-[n] 306, and the incremental backup procedure is complete.

As one can readily appreciate from the above, the use of temporary VM snapshots, together with reverting and switching of the active state of the snapshot tree, allows the active state of the snapshot tree to remain in the most recent bootable state for all but brief moments when temporary VM snapshots are created. Further, if, for some reason, an incremental backup procedure fails to complete, either a "Temp" or a "TempBootable" snapshot will exist, and suitable steps can be taken to redo or complete the incremental backup procedure.

Referring to FIG. 3, in accordance with one or more embodiments of the present invention, a hash disk is present only in Backup VM snapshots on the left-hand side of the snapshot tree, and all snapshots on the right-hand side of the snapshot tree do not include a hash disk. In addition, a VM user cannot change or even see the hash disk, since a VM user always uses a VM snapshot from the right-hand side. Further, if the VM user manually switches the active state of the snapshot tree to one of the Backup VM snapshots, the resulting VM will normally not be bootable. Even if the user manages to boot a VM from one of the Backup VM snapshots, any changes will be automatically discarded the next time an incremental backup is made, since the changes would not be captured in any redo log file. As such, the incremental backup procedure is resistant to possible accidental or malicious changes to its stored data.

In accordance with one or more embodiments of the present invention, by maintaining a snapshot tree, a user can boot a VM using any "Bootable" or "BeforeBackup" VM snapshot. Typically, the selection of a particular snapshot to use is facilitated by a graphical user interface which can present the user with appropriate guidance and choices. This can be important for recovering from a problem that is not detected immediately. For example, if the source system is infected with a virus, but the presence of the virus is discovered only several days later, the virus is likely to be present in all recent incremental backups. The user can boot preceding snapshots, one at a time, until one is found which does not contain the virus.

Typically, users do not need to keep snapshots indefinitely. The incremental backup procedure can limit the number of "Backup" VM snapshots created to a user-selectable number. A typical default number of incremental backups can be set to 10, for example, or the number of incremental backup procedures scheduled in some time interval such as one or several days. Alternatively, shorter- and longer-term limits can be set, for example, by keeping up to a selectable number of most recent backups plus one backup per day for a selectable number of days. All Backup VM snapshots beyond these limits can be collapsed after each successful incremental backup procedure, and the corresponding Bootable and BeforeBackup VM snapshots can be automatically removed and discarded. In accordance with one or more embodiments of the present invention, selection of user-configurable options can be facilitated by a graphical user interface providing guidance and selection options for configuration and customization of backup procedure options.

In one or more embodiments, hashes are calculated to determine which blocks to copy. However, the hash-based approach to determining which blocks need to be copied requires an entire source volume to be read into memory so that the hash value of each block can be calculated. Obviously, only used blocks need to be read, but even just the used blocks can constitute a large amount of data to read. For a large disk it can take a long time to read all the data. Further, the time required is proportional to the total size of all files on the volume, not the size of modified blocks. Thus, source volume hash calculations can prevent the incremental backup procedure from achieving an acceptably small recovery point objective (i.e., RPO, which is an amount of data loss measured in time that is a target maximum time). For backup operations, RPO determines an acceptable maximum interval between consecutive backups.

In accordance with one or more embodiments of the present invention, a bitmap driver is used to determine which blocks to copy. The bitmap driver can be run on the source system to maintain a bitmap that records all blocks on all volumes that have been modified since a particular start time. Multiple bitmaps can be maintained to track changes from different start times. The incremental backup procedure can use these bitmaps to determine which blocks need to be transferred instead of reading every used block on the source volume(s) and calculating hashes. The time required to do so will depend only on the amount of changed data, and thus a much shorter RPO can be achieved.

Even if the process uses a bitmap driver, it can still be advantageous to calculate and maintain hash values for all blocks so that the process can fall back to the hash-based method of determining changed blocks in case the bitmap driver is not available or malfunctions. For the incremental backup procedure to use the information provided by the bitmap driver, the driver must guarantee that if a block is marked as unmodified in the driver's bitmap, then the block has indeed not been modified since the time the driver started tracking changes. Without this guarantee, the incremental backup procedure cannot produce a consistent backup image of the source system. In most cases, the driver can and does so guarantee, but there are several cases when the driver can potentially miss a write operation and fail to provide the necessary guarantee. For example, one implementation of the bitmap driver keeps the bitmap of modified blocks in volatile memory. In this implementation, if the source system is rebooted or crashes, the driver cannot provide consistent information, and should not be relied upon. The driver implementation could be changed to have persistent bitmaps preserved across reboots, but it would still be vulnerable to system crashes. A system crash could damage the persistent bitmap and even the underlying file system, thereby making the bitmap unreliable. It should be noted that non-persistent bitmaps in volatile memory are faster to calculate and do not add much overhead to the source system. Persistent bitmaps would require the driver to write information to the file system (typically located on a disk drive), which would drain more resources from the source system.

In accordance with one or more embodiments of the present invention, the bitmap driver runs when the system starts, and continues running until the system is shut down or restarted. However, before the operating system is started, the system is controlled by the BIOS, and the driver is not yet running. Most users do nothing during this time, but it is possible to boot into a different operating system either from a CD or a network. There is no guarantee that this alternate operating system (or the user) will not attempt to write to the volumes that should be monitored by the bitmap driver. If this happens, the information provided by the bitmap driver will be inconsistent and should not be used for incremental backup.

The hash-based approach is operating system agnostic, does not require exclusive control of the source system, can handle any reboots/crashes of the source system and any multiboot environment, and places no strain on the source system between incremental backups. However, because it requires all used blocks to be read for each incremental backup, it typically cannot achieve as small an RPO as the bitmap driver.

In contrast, the bitmap driver approach does not require reading all used blocks, reports changed blocks directly, and can achieve a very small RPO. At the same time, it requires operating-system-specific drivers, may be affected by reboots, drains resources from the source between incremental backup procedures (even more so for persistent bitmaps), and cannot handle crashes of the source system.

The potential for a very short RPO makes it desirable to use a bitmap driver whenever possible. However, given the number of possible failure modes, it is typically not desirable to rely on a bitmap driver exclusively. In accordance with one or more embodiments of the present invention, the incremental backup procedure can use the bitmap driver whenever it can be relied on and fall back to the hash-based approach to guarantee the consistency of each incremental backup if any events may have occurred to invalidate the bitmap. The incremental backup procedure can check for the occurrence of any reboot events or other events that could invalidate the bitmap, and if any such event has occurred since the last incremental backup, the incremental backup procedure can use the hash data instead.

Figure 5:
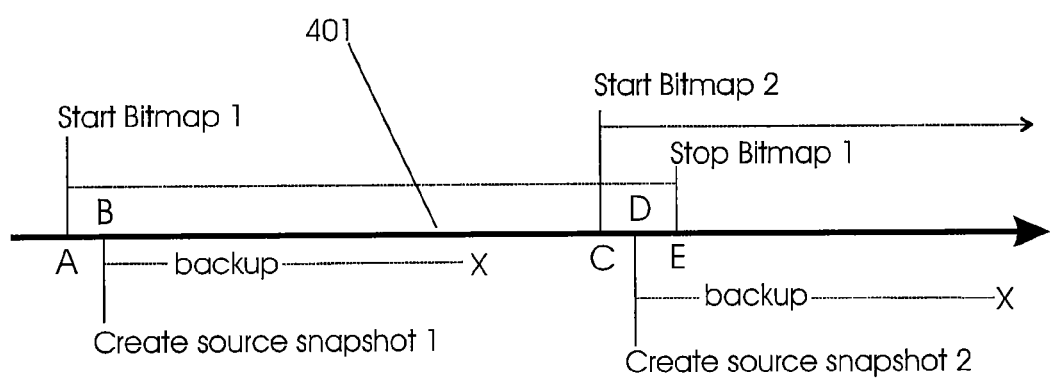
FIG. 5 is a timeline that helps illustrate a method of starting and stopping storing change bitmaps when using a bitmap driver in accordance with one or more embodiments of the present invention.

In accordance with one or more embodiments of the present invention, a bitmap driver records a change state of blocks after a particular start time. When used with incremental backups, a new start time is set and a new bitmap is created for each incremental backup. Further, the previous bitmap is frozen ("stopped"). Proper sequencing of starting and stopping times for each bitmap relative to the source snapshot times is important to ensure that all changes are captured. Typical CPUs simulate simultaneous parallel computation by timesharing, and it is possible that changes could be made to a source volume by another process in between the time that one bitmap was frozen and the next was started. One embodiment of a method that ensures all changes are captured is described below in conjunction with timeline 401 of FIG. 5. As shown in FIG. 5, the time intervals of successive bitmaps overlap slightly. In particular, as shown in FIG. 5, Bitmap 1 is started at time A immediately prior to the creation of a source snapshot used for one full or incremental backup at time B. (While the incremental backup procedure does nothing between time A and time B, it is possible that other running processes may cause a finite delay between time A and time B.) Thereafter, for each succeeding incremental backup, a new bitmap is created. In particular, Bitmap 2 is started at time C immediately prior to the creation of a new source snapshot for the next incremental backup at time D. As further shown in FIG. 5, changes to the previous bitmap, i.e., Bitmap 1, are stopped (i.e., no more changes are captured) at time E which is immediately after the creation of the new source snapshot at time D. While the time interval between time C and time E is typically short, it is non-zero, and the source system may be busy with other applications that can modify a few blocks on one or more source volumes during that interval. Because there can be a slight overlap in the change information stored in successive bitmaps, there can be a slight duplication of blocks transferred during successive incremental backups. The number of such duplicate block transfers will generally be small compared to the total number of blocks transferred, so the additional time required will be negligible.

Figure 6:
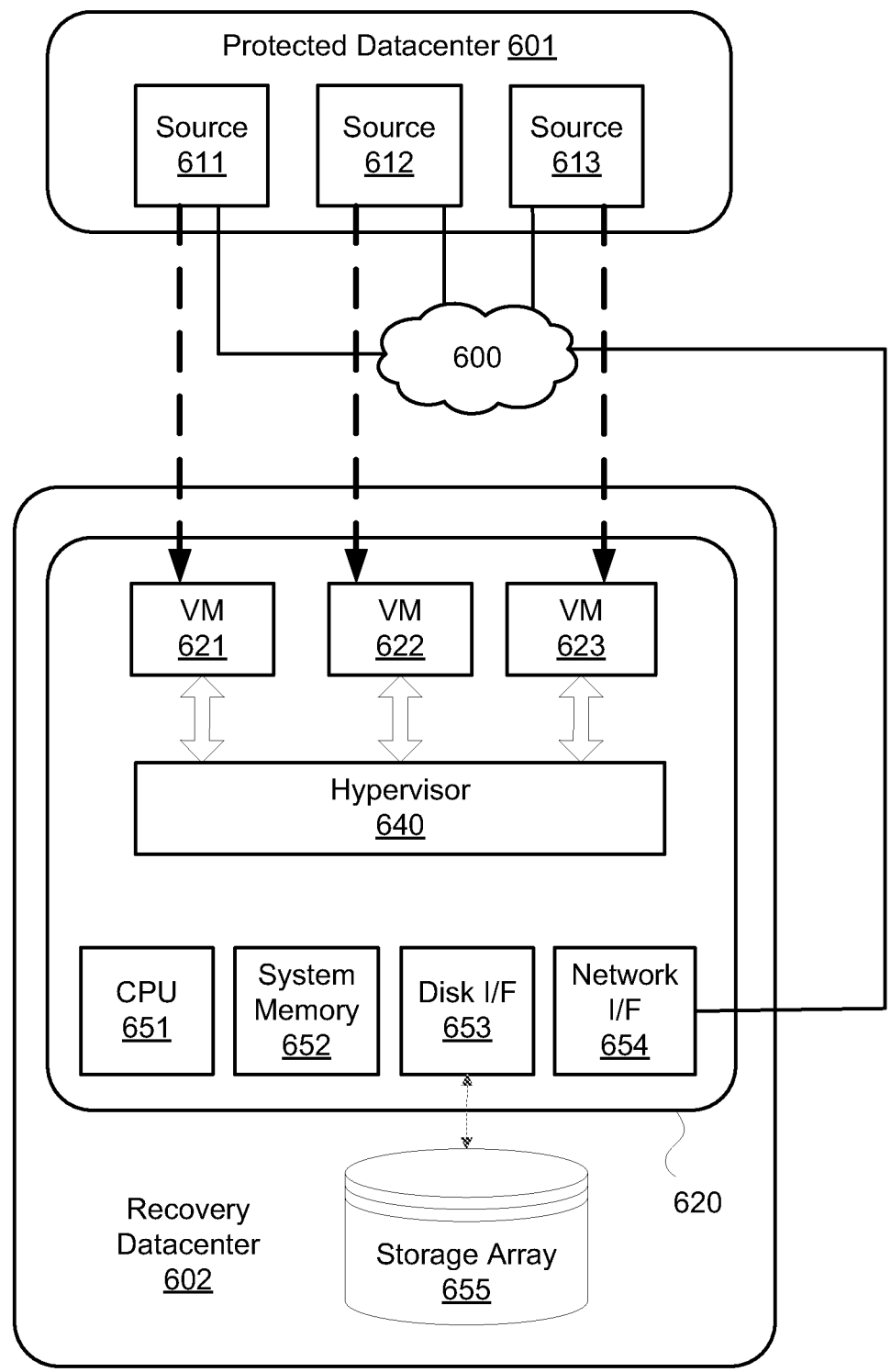
FIG. 6 is a block diagram of a physical-to-virtual disaster recovery system in which one or more embodiments of the invention can be implemented.

FIG. 6 is a block diagram of a physical-to-virtual disaster recovery (P2VDR) system in which one or more embodiments of the invention can be implemented. Although embodiments of the invention are illustrated in the context of P2VDR, persons skilled in the art will recognize that the invention is applicable to other contexts, such as regular backups, source snapshotting, etc. The P2VDR system includes two datacenters, datacenter 601 and datacenter 602, in separate geographical locations that are connected through a network 600. The recovery datacenter, which is datacenter 602, is far enough from the protected datacenter, which is datacenter 601, to qualify for disaster recovery. In one embodiment, the geographical separation is 100 km.

Protected datacenter 601 houses source machines referred to herein as source 611, source 612, and source 613. VM 621 is a backup of source 611. VM 622 is a backup of source 612. VM 623 is a backup of source 613. VM 621, VM 622, and VM 623 each run in a computer system 620 that is housed in recovery datacenter 602. In the embodiment of FIG. 6, three virtual machines and three source machines are shown. However, the invention is applicable to any number of virtual machines and source machines.

Computer system 620 is the host system for VM 621, VM 622, and VM 623, and has conventional hardware resources of a computing device, such as CPU 651, system memory 652, a disk interface 653, and network interface 654, that are shared by VM 621, VM 622, and VM 623. Examples of disk interface 653 are a host bus adapter and a network file system interface. An example of network interface 654 is a network adapter. The virtual machines, VM 621, VM 622, and VM 623, run on top of a hypervisor (or virtual machine monitor) 640, which is a software interface layer that enables sharing of the hardware resources of computer system 620 by the virtual machines. Hypervisor 640 may run on top of the host computer's operating system or directly on hardware components of the server platform. Data storage for computer system 620 is served by a storage array 655 (e.g., a disk array).

Figure 7:
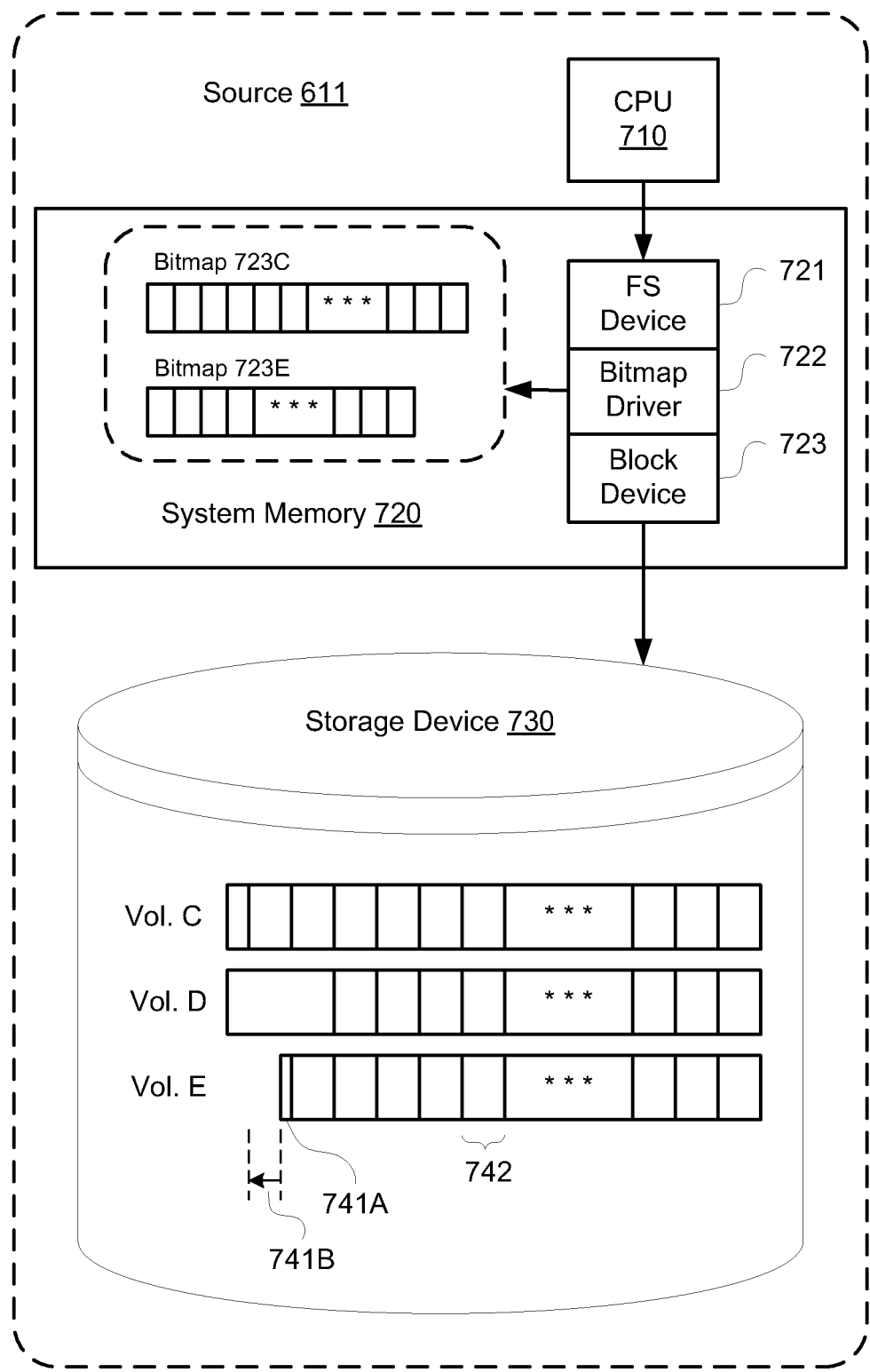
FIG. 7 is a block diagram of a source machine that is configured to handle incremental physical-to-virtual conversion in the system of FIG. 6.

FIG. 7 is a block diagram of a source machine that is configured to handle incremental physical-to-virtual conversion in the system of FIG. 6. The source machine shown in FIG. 7 is source 611. Source 611 includes CPU 710, system memory 720, and storage device 730, and is configured with a bitmap driver 722 that keeps track of changes to blocks of storage device 730 using bitmaps and a backup application (not shown) that reads the bitmaps to determine which blocks have changed and transmits the changed blocks to a backup VM, i.e., VM 621, at the next scheduled backup cycle through a network interface (not shown). A bitmap is provided for each volume of storage device 730 that is tracked. In the embodiment illustrated in FIG. 7, disk volumes C and E are being tracked using bitmaps 723C and 723E that are maintained in system memory 720. Each bitmap has as many bits as the number of blocks in the disk volume it is tracking. A bitmap driver 722 is used to update the bitmaps according to the writes that are issued to the disk volumes. Bitmap driver 722 is between a block device 723, which reads and writes blocks from and to storage device 730, and a file system (FS) device 721, which interprets the blocks and provides a logical view of in terms of files and directories.

In essence, bitmap driver 722 is a type of a filter driver on top of block device 723. When a write is issued through block device 723 to disk volume C, bitmap driver 722 updates bitmap 723C and sets to 1 the bits of bitmap 723C corresponding to the blocks that are being written. In the same manner, when a write is issued through block device 723 to disk volume E, bitmap driver 722 updates bitmap 723E and sets to 1 the bits of bitmap 723E corresponding to the blocks that are being written. Copies of operating system (OS) files, such as boot drivers including bitmap driver 722, other drivers, and OS configuration files (for example, the registry on WINDOWS®) are stored within one or more of the disk volumes.

Figure 8:
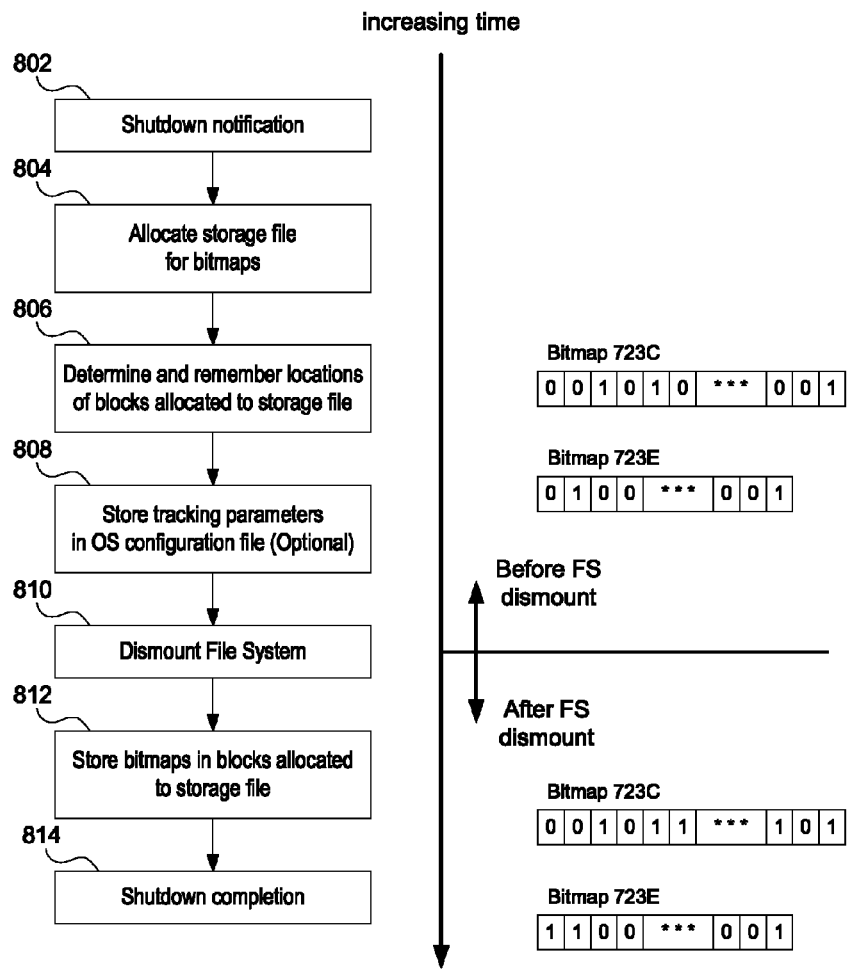
FIG. 8 illustrates a process for shutting down the source machine of FIG. 7 in accordance with one or more embodiments of the invention.

FIG. 8 illustrates a process for shutting down the source machine of FIG. 7 in accordance with one or more embodiments of the invention. In this process, writes to storage device 730 are tracked and committed to storage device 730 after the file system for the source machine is dismounted and no longer available. The shutdown process begins in step 802 with the operating system notifying its drivers of a shutdown. Then, in step 804, a tracking file of a certain size is allocated for the bitmaps that are being maintained in system memory 720. After the tracking file has been allocated, the block chain for this file is determined and kept in system memory 720, in step 806. The block chain indicates the absolute locations in storage device 730 of the blocks that have been allocated to the tracking file. The block chain can be determined through any method known in the art, e.g., by using an API that is commonly available for obtaining the block chain for a file. In step 808, which is an optional step as further described below, tracking parameters are stored in an OS configuration file. Tracking parameters include a block offset and a file system block size for each disk volume being tracked. The block offset accounts for the fact that the first block appearing at the beginning of a disk volume may not be a file system block and may have a size that is different from the size of the file system blocks defined for that disk volume. The block offset is a logical offset that is applied so that the end of the first block is aligned with the beginning of the file system blocks. For example, if the first block size is 1 kilobyte (as indicated by 741A) and the file system block size is 4 kilobytes (as indicated by 742), the block offset is −3 kilobytes (as indicated by 741B). In step 810, the file system is dismounted. In connection with this, writes to storage device 730 may occur as a result flushing of caches and updates to metadata. Bitmap driver 722 monitors these writes and updates the bitmaps maintained in system memory 720 accordingly. FIG. 8 shows bitmaps 723C and 723E before and after the file system dismount to illustrate how they may change as a result of writes that may occur in connection with the file system dismount. After the file system is dismounted, no more writes to storage device 730 can occur and the bitmaps maintained in system memory 720 are in their final state. Therefore, in step 812, the bitmaps maintained in system memory 720 are flushed directly to blocks in storage device 730 that have been allocated to the tracking file. The completion of the remainder of the shutdown process is indicated as step 814.

Figure 9:
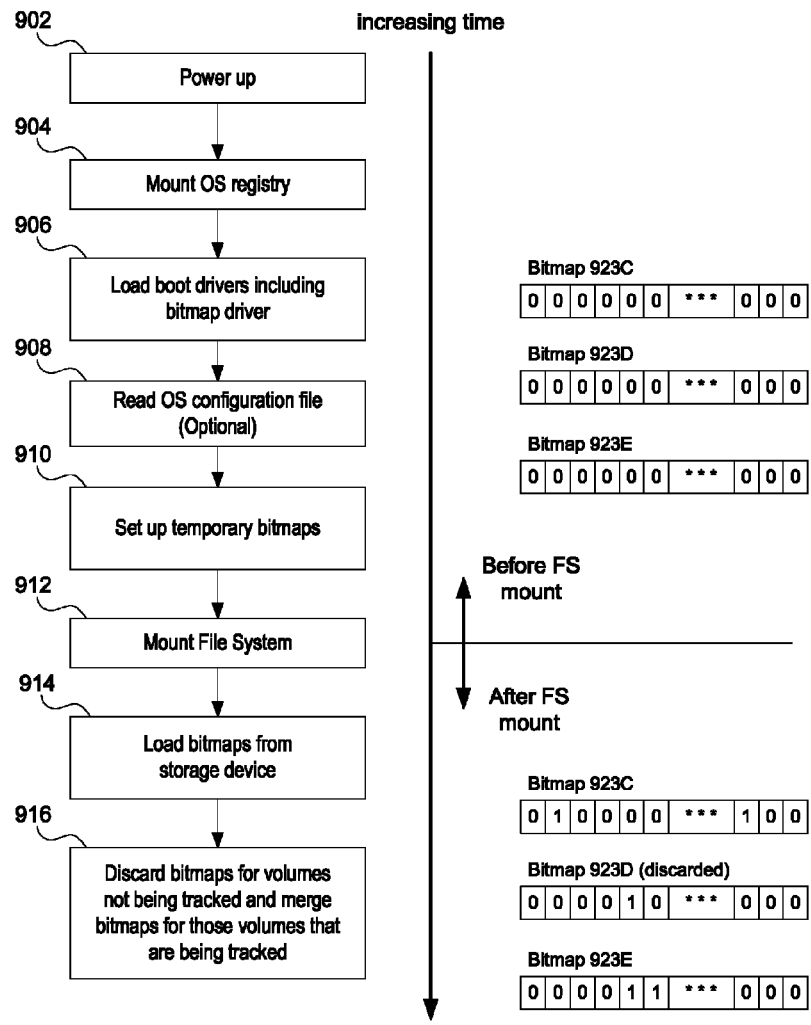
FIG. 9 illustrates a process for booting the source machine of FIG. 7 in accordance with one or more embodiments of the invention.

FIG. 9 illustrates a process for booting the source machine of FIG. 7 in accordance with one or more embodiments of the invention. In this process, writes to storage device 730 are tracked using temporary bitmaps maintained in system memory 720 (and later merged with bitmaps contained in the tracking file) before the file system is mounted, so that writes that may occur prior to the loading of the tracking file into system memory 720 can be reflected in the bitmaps. This process begins with power up, indicated as step 902. In step 904, the OS configuration file is mounted. Then, in step 906, boot drivers, including bitmap driver 722, are loaded into system memory 720. In step 908, which is an optional step as further described below, tracking parameters, such as block offset and block size, for each disk volume being tracked are then read from the OS configuration file. Disk volumes come on-line at various times during the boot process and prior to the mounting of the file system. In step 910, bitmap driver 722 sets up temporary bitmaps in system memory 720 to keep track of writes to those disk volumes that have come on-line, and subscribes to those disk volumes that have not come on-line. Later, when such disk volumes come on-line, bitmap driver 722 sets up temporary bitmaps in system memory 720 for such disk volumes. In step 912, the file system is mounted. Writes may begin as soon as the file system is mounted. This may occur, for example, during repair operations following an improper dismounting of the file system. Bitmap driver 722 monitors these writes and updates the temporary bitmaps maintained in system memory 720 accordingly. FIG. 9 shows the temporary bitmaps 923C, 923D, and 923E before and after the mounting of the file system to illustrate how they may change as a result of writes that may occur soon after the mounting of the file system. In step 914, the tracking file is retrieved and the bitmaps contained in the tracking file are loaded into system memory 720. Step 916 is carried out to discard the temporary bitmaps for the volumes that are not being tracked, e.g., bitmap 923D, and to merge the temporary bitmaps for the volumes that are being tracked, e.g., bitmap 923C and bitmap 923E, with the bitmaps contained in the tracking file. The merging carried out in step 916 is a logical OR operation. This is illustrated in FIG. 10A, which shows the merging of temporary bitmap 923C with bitmap 723C, and in FIG. 10B, which shows the merging of temporary bitmap 923E with bitmap 723E. After step 916, bitmap driver 722 employs the merged bitmaps 1023C and 1023E for tracking further writes to disk volumes C and E, respectively.

Figure 11A:
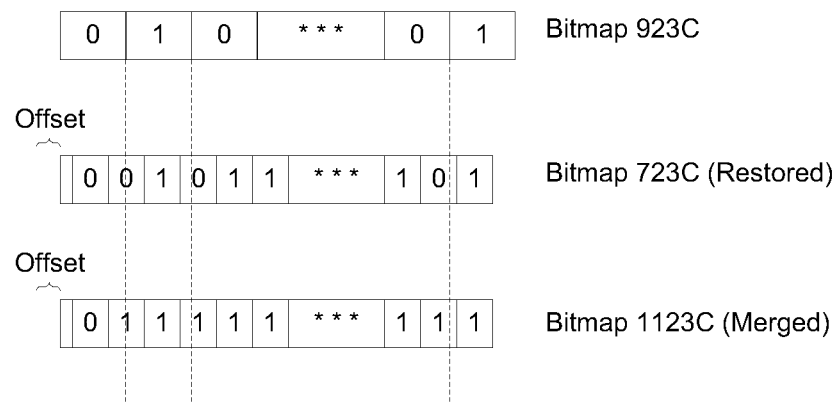
FIGS. 11A and 11B illustrate the process of merging bitmaps in accordance with another embodiment of the invention.
Figure 11B:
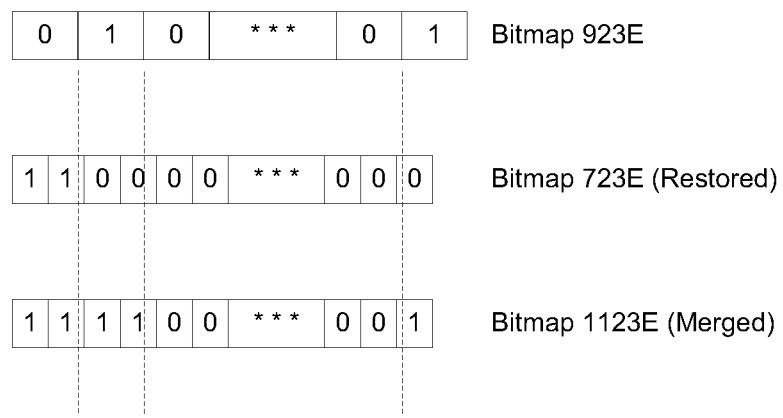

In an alternative embodiment of the invention, step 808 during the shutdown process and step 908 during the boot process are not carried out. As a result, tracking parameters are not available to bitmap driver 722 when the temporary bitmaps are set up in step 910. In such an embodiment, bitmap driver 722 assumes a block offset and a block size, e.g., offset of 0 bytes and block size of 4 kilobytes. FIG. 11A shows temporary bitmap 923C with an assumed offset and an assumed block size relative to bitmap 723C with an actual offset and an actual block size. If the assumption on the offset and/or the block size is not correct, the two bitmaps will not be aligned. For example, if the actual block offset for disk volume C is not 0 as assumed for temporary bitmap 923C and is of a finite value, the two bitmaps will be misaligned. Likewise, if the actual block size is different from assumed block size, the two bitmaps will be misaligned. The misalignment caused by the incorrectly assumed offset and block size is illustrated in FIG. 11A. FIG. 11B illustrates the case where the assumed offset is correct but the assumed block size is not. In both FIGS. 11A and 11B, dashed lines have been drawn to illustrate the misalignment.

Any one of known techniques may be used to correct this alignment. For example, the position of each bit that is set to 1 in bitmaps 923C and 923E is first computed relative to the reference frame of the temporary bitmap. Then, the computed positions are converted to the reference frame of a bitmap having the actual offset and the actual block size, and merging is carried out based on the converted positions.

In the embodiments disclosed above, the source machines being tracked and the virtual machines performing the backup are located in different datacenters, so that the physical-to-virtual backup system can qualify for disaster recovery. In an alternative embodiment, e.g., in situations where disaster recovery is not an objective, the source machines and the virtual machines may be located in the same datacenter. In addition, as noted previously, further embodiments of the invention may be employed for regular backups, source snapshotting, etc.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), such as CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. In a computer system having a processing unit, system memory, and a storage device, the computer system being configured with a file system and a bitmap driver for tracking writes to the storage device by updating tracking data stored in the system memory, a method of tracking writes to the storage device during a shutdown process of the computer system which includes dismounting of the file system, said method comprising:

as a response to initiation of the shutdown process and prior to dismounting the file system in connection with the shutdown process, allocating a tracking file to be stored in the storage device; and after dismounting the file system, tracking the writes to the storage device by storing the writes as tracking data into storage locations in the storage device that have been allocated to the tracking file, wherein, upon reboot of the computer system, the tracking file stored in the storage device is loaded into the system memory for use by the bitmap driver in tracking further writes to the storage device, thereby tracking the writes which occurred during the shutdown process.

2. The method according to claim 1, further comprising:
upon allocating the tracking file, determining the storage locations in the storage device that have been allocated to the tracking file and saving the storage locations in the system memory.

3. The method according to claim 1, wherein the tracking data comprises a bitmap of blocks of the storage device.

4. The method according to claim 3, further comprising:
storing tracking parameters in an operating system configuration file,
wherein the stored tracking parameters are read from the operating system configuration file upon reboot of the computer system.

5. The method according to claim 4, wherein the tracking parameters include a block size.

6. The method according to claim 4, wherein the tracking parameters include a block offset.

7. The method according to claim 3, wherein the storage device is configured with multiple volumes and the tracking data includes a separate bitmap for each of the volumes that are being tracked.

8. The method according to claim 1, wherein the storing the tracking data includes flushing the tracking data into the storage locations in the storage device that have been allocated to the tracking file from the system memory after the file system is dismounted.

9. In a computer system having a processing unit, system memory, and a storage device, the computer system being configured with a file system and a bitmap driver for tracking writes to the storage device by updating tracking data stored in the system memory, a method of tracking writes to the storage device during a boot process of the computer system which includes mounting of the file system, said method comprising:
prior to mounting the file system in connection with the boot process, tracking writes to the storage device which occur prior to the mounting by updating a first tracking data stored in the system memory, thereby tracking the writes to the storage device received at the storage device before the file system is mounted; and
after the file system is mounted, loading the tracking file into the system memory as a second tracking data, merging the first tracking data and the second tracking data, and tracking further writes to the storage device by updating the merged tracking data.

10. The method according to claim 9, further comprising:
reading tracking parameters including a block offset and a block size from an operating system configuration file; and
updating the first tracking data in accordance with the block offset and the block size.

11. The method according to claim 10, wherein the storage device is configured with multiple volumes and the tracking parameters include a separate block offset and a separate block size for each of the volumes that are being tracked.

12. The method according to claim 9, wherein the first tracking data is updated in accordance with an assumed block offset and an assumed block size, and the merging of the first tracking data and the second tracking data corrects for any differences in the assumed offset and the assumed block size and an actual block offset and an actual block size.

13. The method according to claim 9, wherein the storage device is configured with multiple volumes and the first tracking data includes a separate bitmap for each of the volumes and the second tracking data includes a separate bitmap for each of the volumes that are being tracked.

14. The method according to claim 13, wherein:
the tracking file contains information about which multiple volumes are being tracked;
prior to loading the tracking file into the system memory, writes to all of the multiple volumes are tracked by updating the bitmap for each of the multiple volumes; and
after loading the tracking file into the system memory and before merging, discarding the bitmap for the volumes that are not being tracked.

15. A computer backup system, comprising:
a first computer system having a system memory and a storage device; and
a second computer system having a system memory and a virtual machine that is configured to be a backup of the first computer system,
wherein the first computer system is configured with a file system and a bitmap driver for tracking writes to the storage device by updating tracking data stored in the system memory, the tracking data indicating blocks of the storage device that have been modified since a last backup cycle, and
wherein the bitmap driver is configured to track writes which are directed to the storage device while the file system is dismounted during a shutdown process and a reboot process of the first computer system by: (i) committing the tracking data to storage locations of a temporary tracking file in the storage device after the file system is dismounted in connection with the shutdown process, wherein the temporary tracking file is allocated as a response to a notification of initiating the shutdown process, and (ii) after the reboot process is initiated, tracking the writes which are directed to the storage device prior to mounting the file system.

16. The system according to claim 15, wherein the first computer system is housed in a first datacenter and the second computer system is housed in a second datacenter that is physically separated by a distance sufficient to qualify for disaster recovery.

17. The system according to claim 15, wherein the storage device is configured with multiple volumes and the tracking data comprises a bitmap of blocks of the volumes that are being tracked.

18. The system according to claim 17, wherein the tracking file contains information about which multiple volumes are being tracked.

19. The system according to claim 15, wherein:
after the reboot process is initiated and prior to mounting the file system, the bitmap driver tracks writes to the storage device by updating a temporary tracking data stored in the system memory; and
after mounting the file system, the bitmap driver tracks writes to the storage device by updating a merged tracking data stored in the system memory, the merged tracking data being formed by merging the temporary tracking data and a tracking data stored prior to the reboot process.

20. The system according to claim 19, wherein the storage device is configured with multiple volumes and the temporary tracking data includes a separate bitmap for each of the volumes and the tracking data stored prior to the reboot process includes a separate bitmap for each of the volumes that are being tracked.

* * * * *